United States Patent
Hong et al.

(10) Patent No.: US 7,528,573 B2
(45) Date of Patent: May 5, 2009

(54) RECHARGEABLE BATTERY HAVING BARE CELL AND PROTECTION CIRCUIT MODULE

(75) Inventors: Eui Sun Hong, Yongin-si (KR); Jin Uk Lee, Yongin-si (KR)

(73) Assignee: Samsung SDI Co., Ltd., Suwon (KR)

( * ) Notice: Subject to any disclaimer, the term of this patent is extended or adjusted under 35 U.S.C. 154(b) by 401 days.

(21) Appl. No.: 11/372,034

(22) Filed: Mar. 10, 2006

(65) Prior Publication Data

US 2006/0215334 A1 Sep. 28, 2006

(30) Foreign Application Priority Data

Mar. 24, 2005 (KR) .................. 10-2005-0024666

(51) Int. Cl.
*H01M 10/46* (2006.01)
(52) U.S. Cl. ..................................... 320/112
(58) Field of Classification Search ................. 320/107, 320/106, 110, 112, 114, 134, 136; 429/96–100
See application file for complete search history.

(56) References Cited

U.S. PATENT DOCUMENTS

| 5,985,480 | A | * | 11/1999 | Sato et al. .................. 429/65 |
| 6,133,637 | A | * | 10/2000 | Hikita et al. ................ 257/777 |
| 2006/0127756 | A1 | * | 6/2006 | Seo ............................ 429/175 |

FOREIGN PATENT DOCUMENTS

JP       2002-260621   *   9/2002

* cited by examiner

*Primary Examiner*—Edward Tso
(74) *Attorney, Agent, or Firm*—H.C. Park & Associates, PLC (57) ABSTRACT

A rechargeable battery including a bare cell with an electrode assembly having two electrodes and a separator, a case for storing the electrode assembly, a cap plate for covering an opening of the case, and a protection circuit module coupled with the cap assembly. A portion of the lower surface of the protection circuit module is formed of a synthetic resin, and contacts a region of the cap plate also formed of a synthetic resin. The protection circuit module and the cap plate an be coupled together by adhesion, welding or melting.

19 Claims, 8 Drawing Sheets

FIG. 8

RECHARGEABLE BATTERY HAVING BARE CELL AND PROTECTION CIRCUIT MODULE

CROSS REFERENCE TO RELATED APPLICATION

This application claims priority to and the benefit of Korean Patent Application No. 2005-0024666, filed on Mar. 24, 2005, which is hereby incorporated by reference for all purposes as if fully set forth herein.

BACKGROUND OF THE INVENTION

1. Field of the Invention

The present invention relates to a rechargeable battery, and more particularly, to a rechargeable battery in which a protection circuit module is coupled with a bare cell.

2. Discussion of the Background

The use of rechargeable batteries is increasing due to their many advantages, including rechargeability, miniaturization, and increased charging capacity. A rechargeable battery can be classified as either a Ni-MH battery or a Li-ion battery, depending on the type of electrode active materials in the battery.

Generally, rechargeable batteries have bare cells manufactured by installing an electrode assembly with a positive electrode, a negative electrode, and a separator into an aluminum or aluminum alloy case, installing a cap plate on the case, injecting electrolyte into the case, and sealing the case. While the case may be made of iron, an aluminum or aluminum alloy case may be lighter and have improved anti-corrosive properties, even when used at high voltages for extended durations.

With a metallic case, the case may function as an electrode and cause a short circuit with another electrode. Even when the case is insulated from both electrodes and the electrodes are separately extracted from the case, the case may make internal contact with both electrodes to cause a short circuit between the electrodes.

Generally, when a bare cell sealed in a can-type rechargeable battery is coupled with a protection circuit module, which may include a positive temperature coefficient (PTC) element, a thermal fuse, a protection circuit board, or other safety features, the bare cell is stored in a hard case or molded by using a hot-melt resin.

The connection between the bare cell and the protection circuit module is made by connecting each electrode terminal of the bare cell to the corresponding electrode terminal of the protection circuit module on the protection circuit board. Thus, electrical coupling between the bare cell and the protection circuit module is emphasized. However, the mechanical strength of the coupling between the bare cell and the protection circuit module has not been emphasized. To improve the mechanical strength of the connection, the bare cell and the protection circuit may be put into a mold, and a fusion resin is filled into the space between them. Alternatively, they each may be inserted into a hard case.

However, when the latter method is used, the hard cases are coupled together, which increases the manufacturing time and cost required to fabricate the rechargeable battery. Additionally, even when the former method is used, pouring resin into the mold can be difficult. Furthermore, the contact between the molded resin and the metallic bare cell rarely retains its mechanical strength and may be damaged from torsional or bending forces.

SUMMARY OF THE INVENTION

The invention provides a rechargeable-battery, in which a high mechanical strength can be achieved in a connection between the bare cell and the protection circuit module.

Additional features of the invention will be set forth in the description which follows, and in part will be apparent from the description, or may be learned by practice of the invention.

The present invention discloses a rechargeable battery including a bare cell including an electrode assembly with two electrodes and a separator interposed between the two electrodes for preventing a short circuit between the two electrodes, a case for storing the electrode assembly, a cap plate for covering an opening of the case, and a protection circuit module coupled with a contact region of the cap plate, the protection circuit module including a protection circuit, and a portion of a lower surface of the protection circuit module formed of a first synthetic resin. Further, the contact region is formed of a second synthetic resin.

The present invention also discloses a rechargeable battery including a first electrode, a second electrode, a separator interposed between the first electrode and the second electrode, the first electrode, the second electrode, and the separator wound into a jelly-roll type electrode assembly, a case for storing the electrode assembly, a cap plate coupled with a first end of the case, and a protection circuit module coupled with the cap plate, the protection circuit module including a protection circuit coupled with a lead plate. Further, a portion of the cap plate is formed of a first synthetic resin and is coupled with a portion of the protection circuit module formed of a second synthetic resin.

The present invention also discloses a rechargeable battery including a bare cell, a case for storing the bare cell, and a protection circuit module including a protection circuit coupled with the bare cell. Further, the portion of the case is formed of a first synthetic resin and is coupled with a portion of the protection circuit module formed of a second synthetic resin.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element such as a layer, film, region or substrate is referred to as being "on" another element, it can be directly on the other element or intervening elements may also be present. In contrast, when an element is referred to as being "directly on" another element, there are no intervening elements present.

Figure 1:
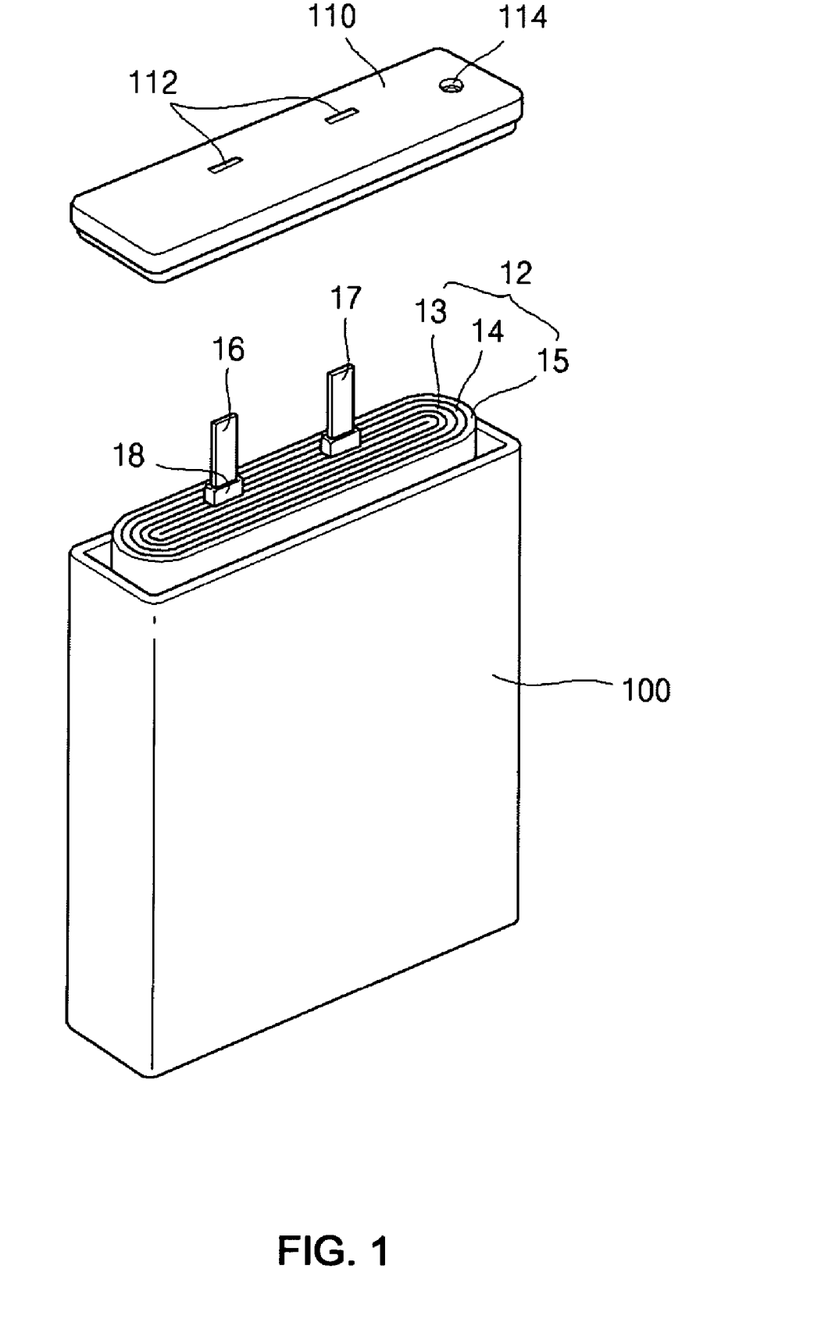
FIG. 1 shows an exploded perspective view of a rechargeable battery made by combining a metallic can and a synthetic resin cap plate according an exemplary embodiment of the present invention.
Figure 2:
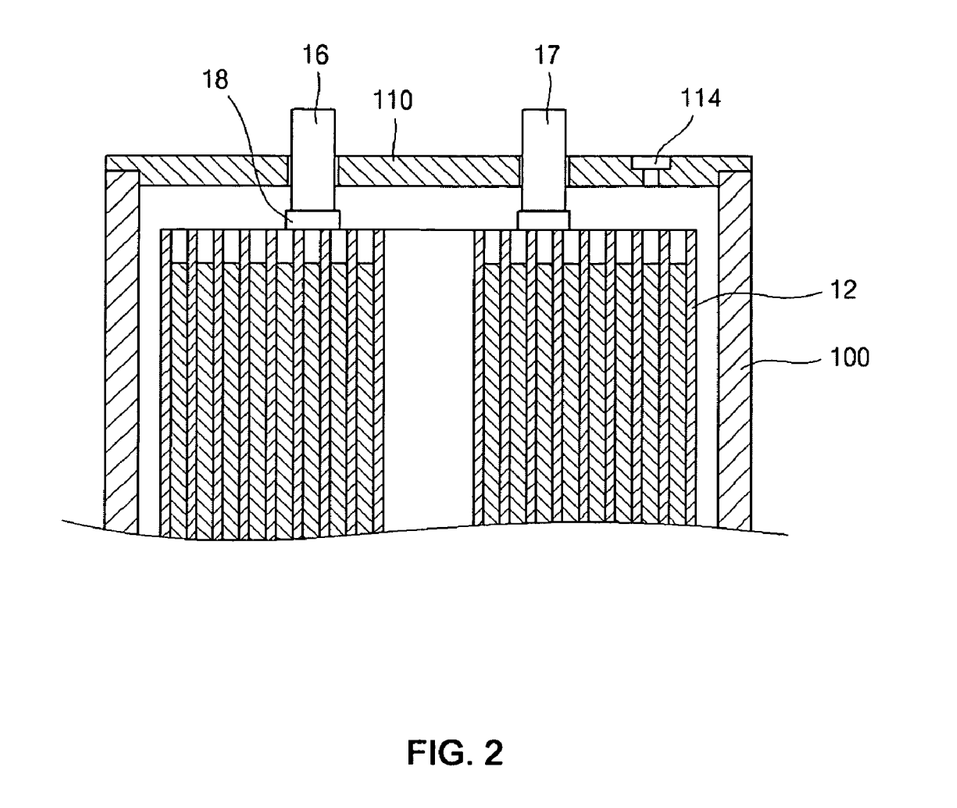
FIG. 2 shows a partial cross-section of a bare cell of FIG. 1.

FIG. 1 shows an exploded perspective view of a rechargeable battery according to an exemplary embodiment of the present invention in which a metallic can and a synthetic resin cap plate are combined with each other, and FIG. 2 shows a partial cross-section of the rechargeable battery of FIG. 1.

A rechargeable battery according to an exemplary embodiment of the present invention will now be described with reference to FIG. 1 and FIG. 2. A can-type rechargeable battery, such as a lithium rechargeable battery or a Ni-MH rechargeable battery, can include a metallic can 100 with a hexahedron shape, an electrode assembly 12 disposed in the can 100, and a cap plate 110 formed of a synthetic resin. The cap plate 110 may be fixed to the opening of the can 100 to seal the upper end of the can 100.

The electrode assembly 12 may be formed by sequentially stacking or stacking and winding a first electrode plate 13, a separator 14, and a second electrode plate 15. The first electrode plate 13 and the second electrode plate 15 may have a thin plate or film shape. A first electrode tab 16 may be electrically coupled with a charge collector, on which activation material is not coated, of the first electrode plate 13. A second electrode tab 17 may be electrically coupled with a charge collector, on which activation material is not coated, of the second electrode plate 15. An insulation tape 18 may be wound around portions of the first electrode tab 16 and the second electrode tab 17 where the first electrode tab 16 and the second electrode tab 17 extend from the electrode assembly 12. The insulation tape 18 may prevent a short circuit between the first electrode tab 16 or the second electrode tab 17 and the first electrode plate 13 or the second electrode plate 15. A separator 14 may have a wider surface than the first electrode plate 13 or the second electrode plate 15 to help prevent a short circuit between the first electrode plate 13 and the second electrode plate 15.

Additionally, to prevent a short circuit between the first electrode plate 13 or the second electrode plate 15 and the can 100, the outermost surface of a jelly roll-type electrode assembly 12 as shown in FIG. 1 may be covered with a separator and tape (not shown), and the lower end of the jelly roll-type electrode assembly 12 may be covered with a finish tape (not shown).

The can 100 may be formed of aluminum or aluminum alloy and may have a hexahedral shape. The electrode assembly 12 may be inserted into the opening of the can 100 so that the can 100 functions as a reservoir for storing the electrode assembly 12 and an electrolyte (not shown).

The cap plate 110 can be a synthetic resin plate with a plate shape corresponding to the opening of the can 100. Two thru-holes 112 can be formed in the cap plate 110, through which the first electrode tab 16 and the second electrode tab 17 extend. Contacting portions of the cap plate 110 and the opening of the can 100 may be sealed by applying a heated weld. However, since the materials of the cap plate 110 and the can 100 may be different, welding may be difficult. Therefore, another method for fixing the cap plate 110 to the can 100, such as an adhesive, may be used. An injection hole 114 can be used to inject electrolyte into the can 100.

When the cap plate 110 is coupled with the can 100, the first electrode tab 16 and the second electrode tab 17 extend through the thru-holes 112. The gaps between the thru-hole 112 and the first electrode tab 16 and between the thru-hole 112 and the second electrode tab 17 can be sealed. Adhesives such as epoxy may be applied or welding may be performed to seal these gaps. The portions of the first electrode tab 16 and the second electrode tab 17 extending out of the thru-holes 112 can be bent to be adjacent to the cap plate 110 to provide a first electrode terminal 16' and a second electrode terminal 17' of the bare cell, as shown in FIG. 3.

Figure 3:
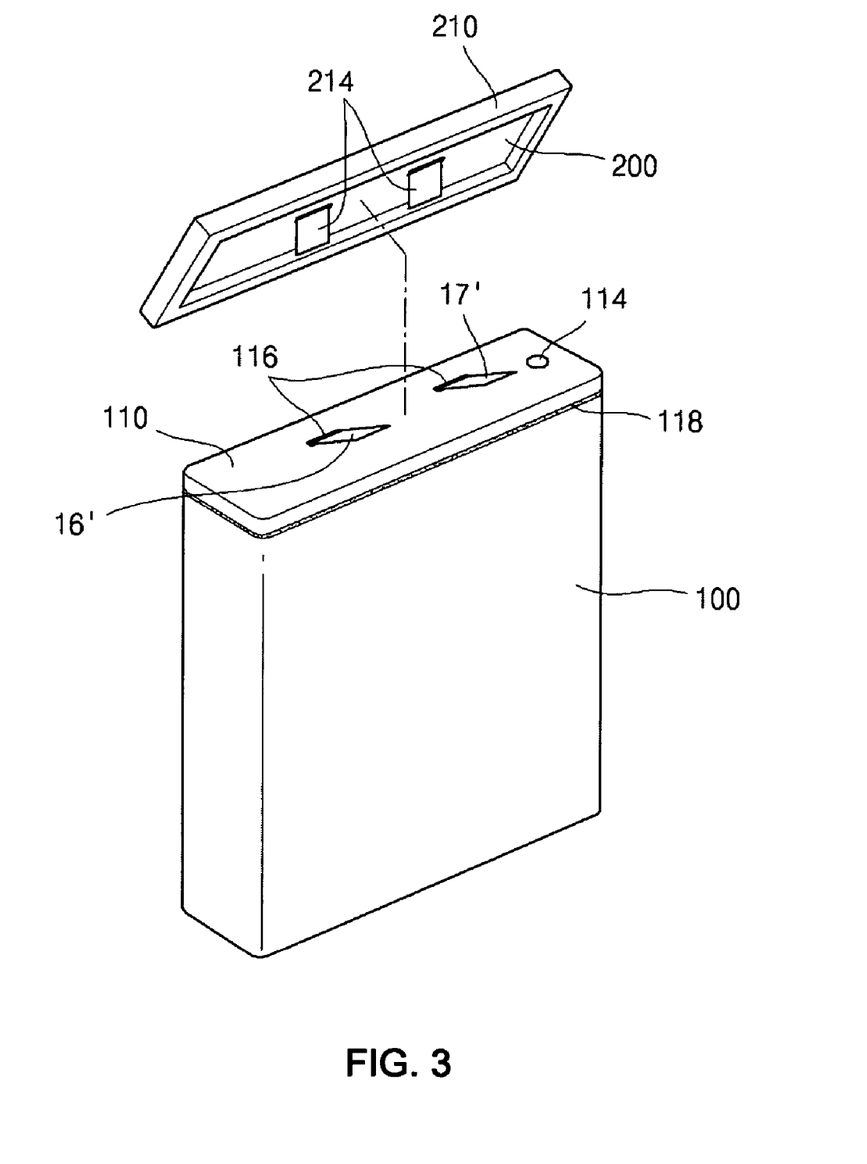
FIG. 3 and FIG. 4 show schematic perspective views of a rechargeable battery with a bare cell and a protection circuit module having an outer surface made of a synthetic resin according to an exemplary embodiment of the present invention shown in FIG. 1 and FIG. 2.
Figure 4:
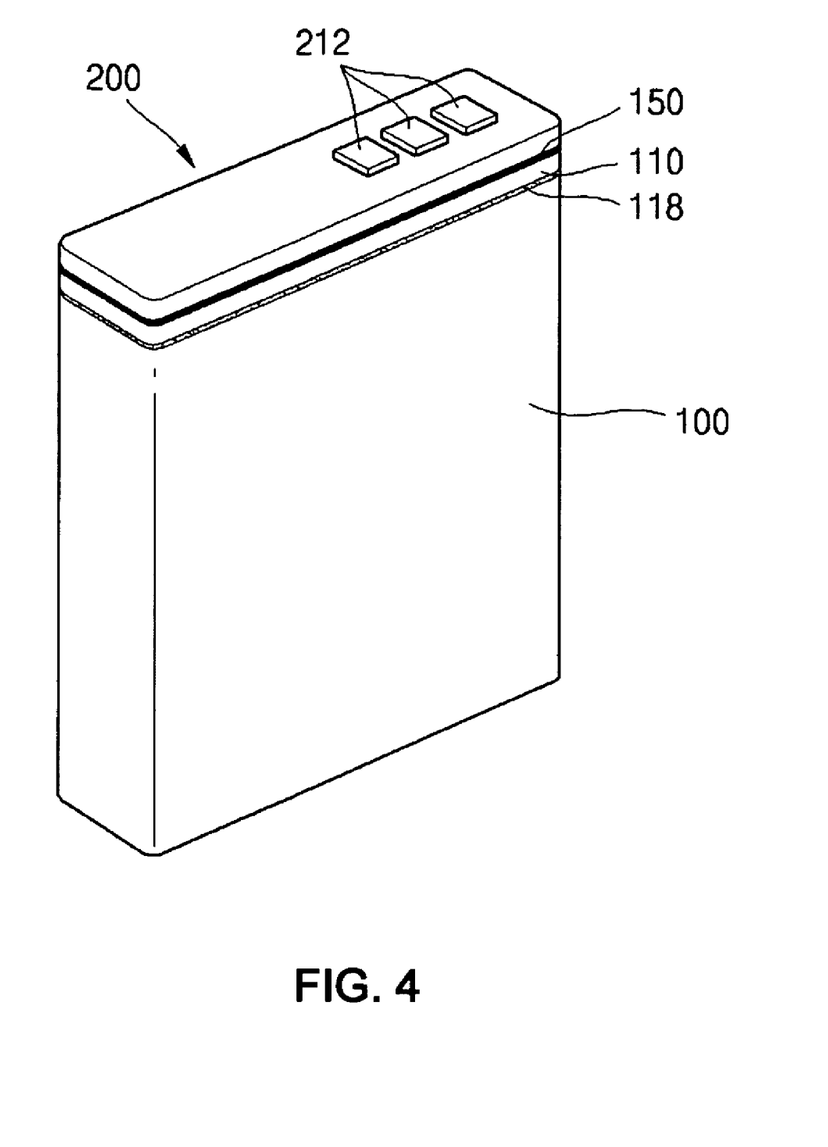

FIG. 3 and FIG. 4 show schematic perspective views of a rechargeable battery with a bare cell and a protection circuit board made of a synthetic resin according to the exemplary embodiment of the present invention shown in FIG. 1 and FIG. 2.

Referring to FIG. 3 and FIG. 4, the bent portion of the first electrode tab 16 may form a first electrode terminal 16' and the bent portion of the second electrode tab 17 may form a second electrode terminal 17' of the bare cell. A protection circuit module 200 with a protection circuit board and other safety units (not shown) is prepared. The protection circuit module 200 may be formed by processing the protection circuit board and the lead plate with a hot-melt, or by mounting the protection circuit board on a separate injection-molded product made of a synthetic resin.

External terminals 212 for connecting the battery to external devices are provided on a top surface of the protection circuit module 200. The top surface of the protection circuit module 200 may be disposed opposite to the surface facing the bare cell. On the surface facing the bare cell, lead plates 214 are coupled with the protection circuit module 200 and contact a first electrode terminal 16' and a second electrode terminal 17' of the bare cell.

As shown in FIG. 3, two lead plates 214 are bent beneath a lower surface, which faces the bare cell, of the protection circuit board 200 to oppose the first electrode terminal 16' and the second electrode terminal 17', which are bent on a top surface of the cap plate 110. Therefore, when the protection circuit module 200 is coupled with the bare cell, the first electrode terminal 16' and the second electrode terminal 17' are each electrically coupled with a lead plate 214 and they bend further to be disposed parallel with the top surface of the cap plate 110.

The lower surface of an edge protrusion 210 of the protection circuit module 200, formed of a synthetic resin and coupled with the lead plates 214, is disposed to face the top surface of the cap plate 110, which is also formed of a synthetic resin. In this arrangement, the contacting portions of the protection circuit module 200 and the cap plate 110 may be bonded by ultrasonic welding or direct-heated welding. FIG. 4 shows the rechargeable battery after the top surface of the cap plate 110 and the lower surface of the edge protrusion 210 of the protection circuit module 200 are bonded by welding along a welding portion of the cap plate 110 and the protection circuit module 200. Then, tubing (not shown) may be provided to the side surfaces or the lower surface of the rechargeable battery to form a complete exterior of the battery.

The cap plate 110 and can 100 may be bonded together using, for example, welding or adhesive along a bonded portion 118. A sealed portion 116 between a thru-hole 112 of the cap plate 110 and an electrode tab 16 or 17 can be sealed using, for example, adhesive or welding. The cap plate 110 and the protection circuit module 200 may be bonded together using, for example, welding along a welded portion 150.

Figure 5:
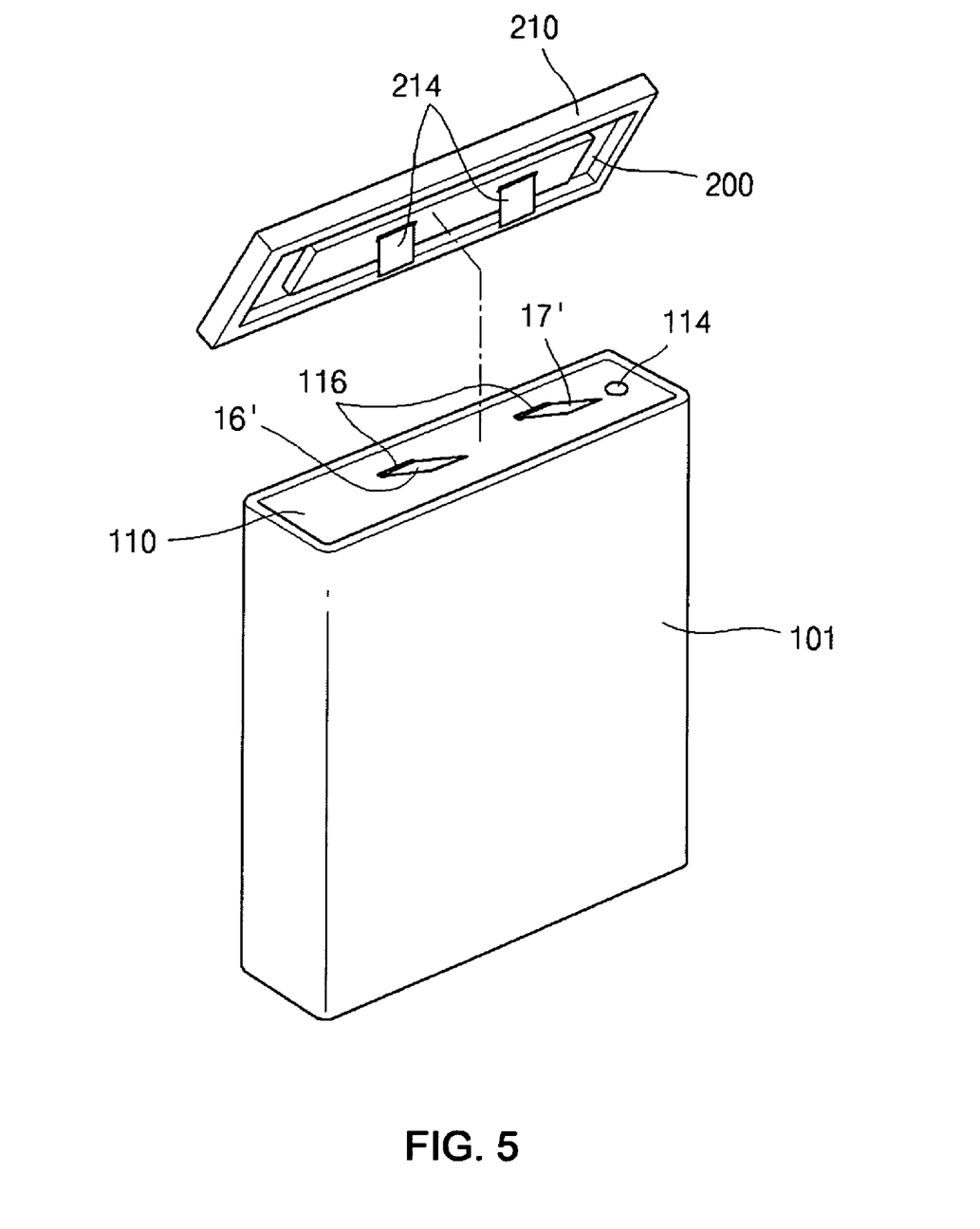
FIG. 5 and FIG. 6 show schematic perspective views of a rechargeable battery with a bare cell and a protection circuit module according to another exemplary embodiment of the present invention.
Figure 6:
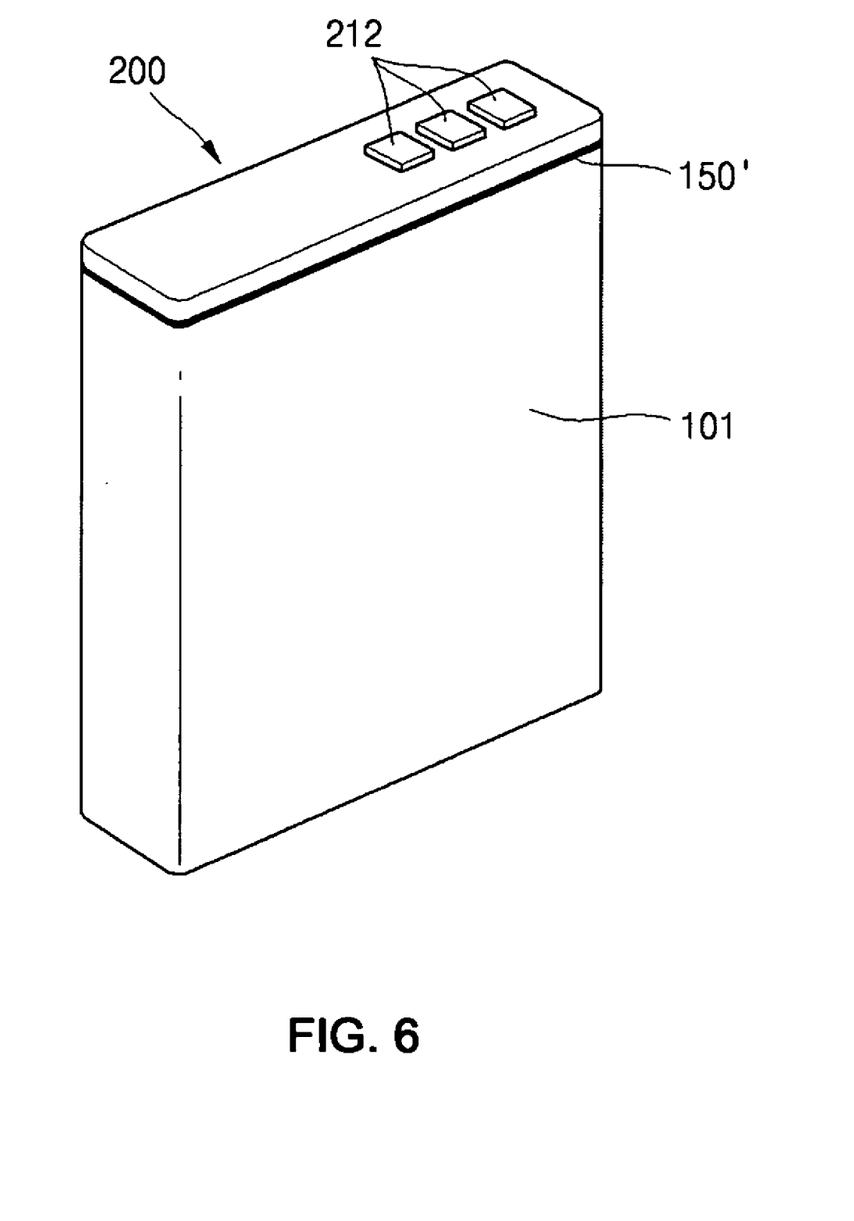

FIG. 5 and FIG. 6 show schematic perspective views of a rechargeable battery with a bare cell and a protection circuit board according to another exemplary embodiment of the present invention.

In the exemplary embodiment shown in FIG. 5 and FIG. 6, unlike the aforementioned exemplary embodiment, the case 101 storing the electrode assembly 12 is formed of a synthetic resin. The cap plate 110 covers the opening of the case 101 by inserting the cap plate 110 inside the opening of the case 101 and applying an adhesive to or welding the contact surfaces of the cap plate 110 and the case 101.

As described above, a sealed portion 116 between a thru-hole 112 and an electrode tab 16 or 17 may be sealed using an adhesive or welding. The portion of the first electrode tab 16 that extends beyond the cap plate 110 may be bent to form a first electrode terminal 16', and the portion of the second electrode tab 17 that extends beyond the cap plate 110 may be bent to form a second electrode terminal 17'. The protection circuit module 200 including a protection circuit and a safety device may also be provided as described above.

Unlike the previous exemplary embodiment, the edge portion of the cap plate 110 is disposed below or co-planar with and surrounded by the top edge of the sidewall of the synthetic resin case 101. Since the case 101 is made of a synthetic resin according to this exemplary embodiment, the case 101 may be easily welded to the edge protrusion 210 of the protection circuit module 200 to form welded portion 150' between the cap plate 110 and case 101. Alternatively, the case 101 may be bonded to the protection circuit module 200 by using a different method such as applying an adhesive to contacting portions of the case 101 and the protection circuit module 200. Where the case 101 and the protection circuit module 200 are formed of an equivalent material, such as a synthetic resin, they can be bonded by melting.

Figure 7:
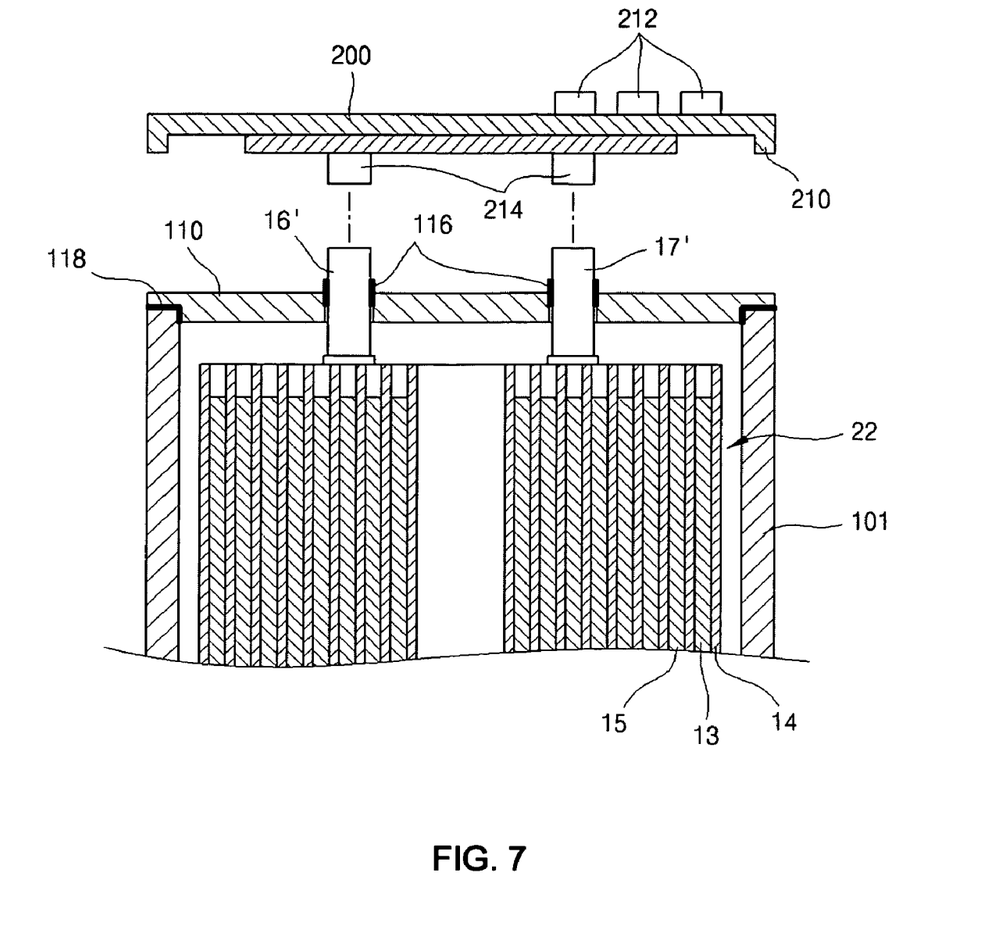
FIG. 7 and FIG. 8 show partial cross-section views of the front and side of the rechargeable battery shown in FIG. 3 and the arrangement of the bare cell and the protection circuit module according to an exemplary embodiment of the present invention.
Figure 8:
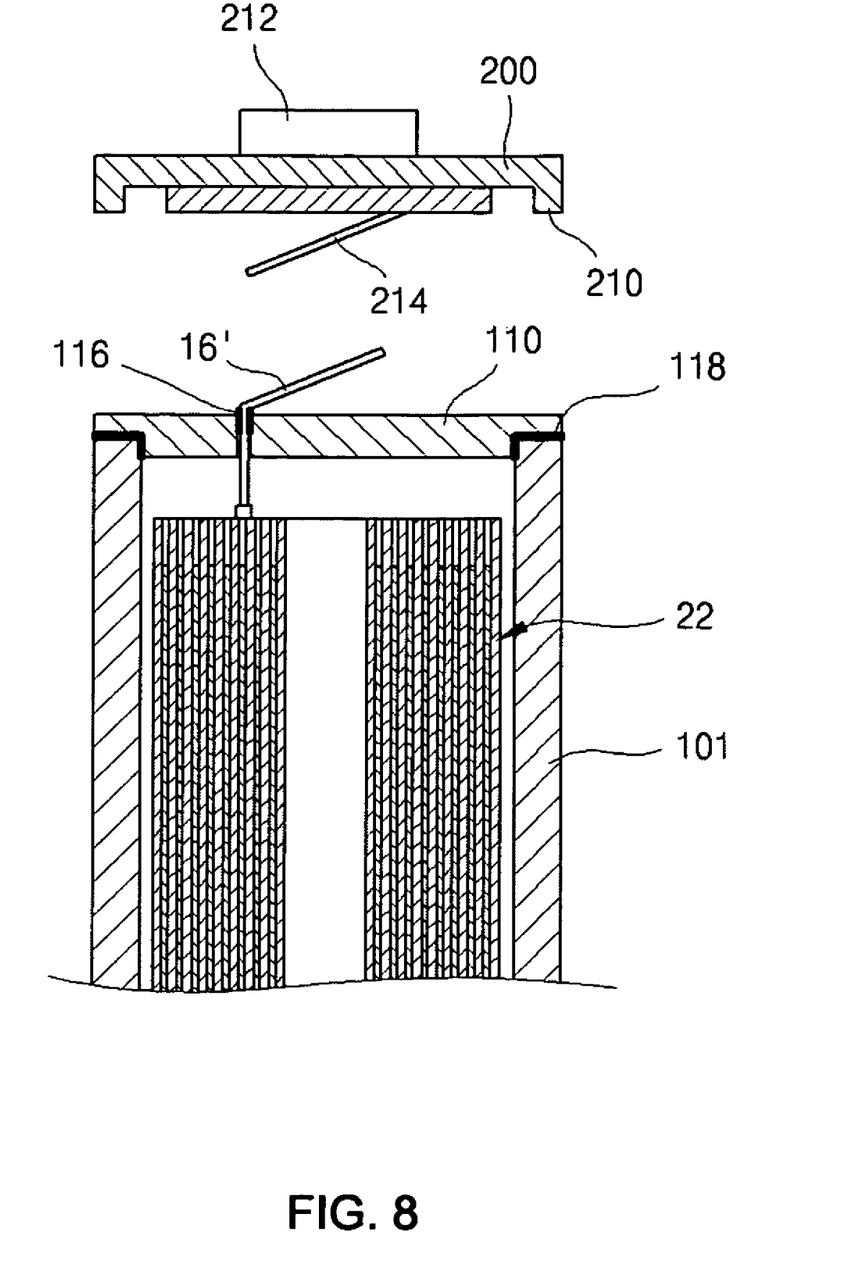

FIG. 7 and FIG. 8 show partial cross-section views of the front and side of the rechargeable battery shown in FIG. 3 and the arrangement of the bare cell and the protection circuit module according to an exemplary embodiment of the present invention.

The protection circuit module 200 has an edge protrusion 210 for facilitating contact with the cap plate 110. The lead plates 214 that have been partially bent face the first electrode terminal 16' and the second electrode terminal 17' that have been formed by bending the ends of the first electrode tab 16 and the second electrode tab 17, respectively. The lead plates 214 are bonded with the first electrode terminal 16' and the second electrode terminal 17' by welding or other methods. The protection circuit module 200 is then pressed down so the edge protrusion 210 may contact the edges of the cap plate 110 and the outer surface of the opening of the case 101. Additionally, the lead plates 214, the first electrode terminal 16' and the second electrode terminal 17' are bent parallel with the top surface of the cap plate 110.

In an alternative exemplary embodiment of the present invention, a trench for storing the first electrode terminal 16' and the second electrode terminal 17' may be formed on the top surface of the cap plate 110. Also, a trench for storing one or more of the lead plates 214 may be formed on the lower inside surface of the protection circuit module 200. In this exemplary embodiment, it is therefore possible to form a region between the top surface of the cap plate 110 and the lower inside surface of the synthetic resin board 200 for storing the lead plates 214, the first electrode terminal 16' and the second electrode terminal 17' that have been bent when the cap plate 110 and protection circuit module 200 are coupled together. Therefore, the cap plate 110 and the protection circuit module 200 may be coupled together without an edge protrusion 210 of the protection circuit module 200.

An engineering plastic having superior weldability and workability with a metallic material or between components formed of the same material can be used as a synthetic resin. Recently developed engineering plastics may have a lighter weight than aluminum and may also retain high mechanical strength. Also, an adhesive may have chemical or thermal resistance to prevent deformation or degeneration from contact with the electrolyte.

For example, epoxy or similar material may be used as an adhesive for sealing a metallic can 100 and a plastic cap plate 110. Additionally, the epoxy may have a short curing time to increase manufacturing yield.

In addition, while a thru-hole 112 for extracting an electrode tab 16 or 17 through the cap plate 110 may be disposed substantially in the center of the cap plate 110 according to the aforementioned exemplary embodiments, a thru-hole 112 may also be disposed near an edge of the cap plate 110 or near a contact region for bonding the cap plate 110 and the opening of the can 100. If the can 100 is made of a metallic material, an insulation material for preventing a short circuit between an electrode tab 16 or 17 and the case 100 may be inserted into the gap between an electrode tab 16 or 17 and the case 100.

According to the present invention, it is possible to provide a rechargeable battery, in which a protection circuit can be conveniently bonded to a bare cell with high mechanical strength.

In addition, it is possible to provide a simple and convenient bonding process for bonding the protection circuit and the bare cell.

Furthermore, if the case 101 or the cap plate 110 is made of a synthetic resin, the number of components of the cap plate 110 may be reduced compared to a conventional metallic can-type rechargeable battery. Therefore, it is possible to reduce manufacturing cost.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A rechargeable battery, comprising:
    a bare cell including an electrode assembly with two electrodes and a separator interposed between the two electrodes for preventing a short circuit between the two electrodes;
    a case for storing the electrode assembly;
    a cap plate for covering an opening of the case; and
    a protection circuit module coupled with a contact region, the protection circuit module including a protection circuit, and a portion of a lower surface of the protection circuit module is formed of a first synthetic resin, wherein the contact region is disposed on a portion of the case or a portion of the cap plate, and is formed of a second synthetic resin.

2. The rechargeable battery of claim 1, wherein the contact region and the protection circuit module are bonded by melting the first synthetic resin and the second synthetic resin.

3. The rechargeable battery of claim 2, wherein the first synthetic resin and the second synthetic resin are melted by thermal-melting or ultrasonic melting.

4. The rechargeable battery of claim 1, wherein the contact region and the protection circuit module are bonded with an adhesive.

5. The rechargeable battery of claim 1, wherein the first synthetic resin and the second synthetic resin comprise the same material.

6. The rechargeable battery of claim 5, wherein the first synthetic resin and the second synthetic resin comprise an engineering plastic.

7. The rechargeable battery of claim 1, wherein the cap plate is arranged on the case, the case being made of metal.

8. The rechargeable battery of claim 1, wherein the cap plate is arranged in the opening of the case, the case being made of a synthetic resin.

9. The rechargeable battery of claim 1, wherein the cap plate comprises a thru-hole, an electrode tab coupled with an electrode extends through the thru-hole, and the electrode tab functions as an electrode terminal of the bare cell.

10. The rechargeable battery of claim 9, wherein the protection circuit module includes a lead plate coupled with the electrode tab, and the lead plate is bent to be substantially parallel with a top surface of the cap plate.

11. The rechargeable battery of claim 1, wherein the first synthetic resin and the second synthetic resin comprise an engineering plastic.

12. The rechargeable battery of claim 1, wherein the protection circuit module includes an edge protrusion extending out from the protection circuit module.

13. A rechargeable battery, comprising:
a first electrode;
a second electrode;
a separator interposed between the first electrode and the second electrode, the first electrode, the second electrode, and the separator wound into a jelly-roll type electrode assembly;
a case for storing the electrode assembly;
a cap plate coupled with a first end of the case; and
a protection circuit module coupled with the cap plate, the protection circuit module including a protection circuit coupled with a lead plate;
wherein a portion of the cap plate is formed of a first synthetic resin and is coupled with a portion of the protection circuit module formed of a second synthetic resin.

14. The rechargeable battery of claim 13, wherein the portion of the cap plate is welded to the portion of the protection circuit module.

15. The rechargeable battery of claim 13, wherein the portion of the cap plate is coupled with the portion of the protection circuit module with an adhesive.

16. A rechargeable battery, comprising:
a bare cell;
a case for storing the bare cell; and
a protection circuit module including a protection circuit coupled with the bare cell;
wherein a portion of the case is formed of a first synthetic resin and is coupled with a portion of the protection circuit module formed of a second synthetic resin.

17. The rechargeable battery of claim 16, wherein the portion of the case is welded to the portion of the protection circuit module.

18. The rechargeable battery of claim 16, wherein the portion of the case is coupled with the portion of the protection circuit module with adhesive.

19. The rechargeable battery of claim 16, wherein the bare cell comprises:
a first electrode;
a second electrode;
a separator interposed between the first electrode and the second electrode, the first electrode, the second electrode, and the separator wound into a jelly-roll type electrode assembly;
a first electrode terminal coupled between the first electrode and a first lead plate of the circuit protection module; and
a second electrode terminal coupled between the second electrode and a second lead plate of the circuit protection module.

* * * * *